Nov. 11, 1969  G. J. PEENE  3,477,653
METHOD AND MEANS FOR WINDING OF STRAND MATERIAL
Filed March 5, 1968
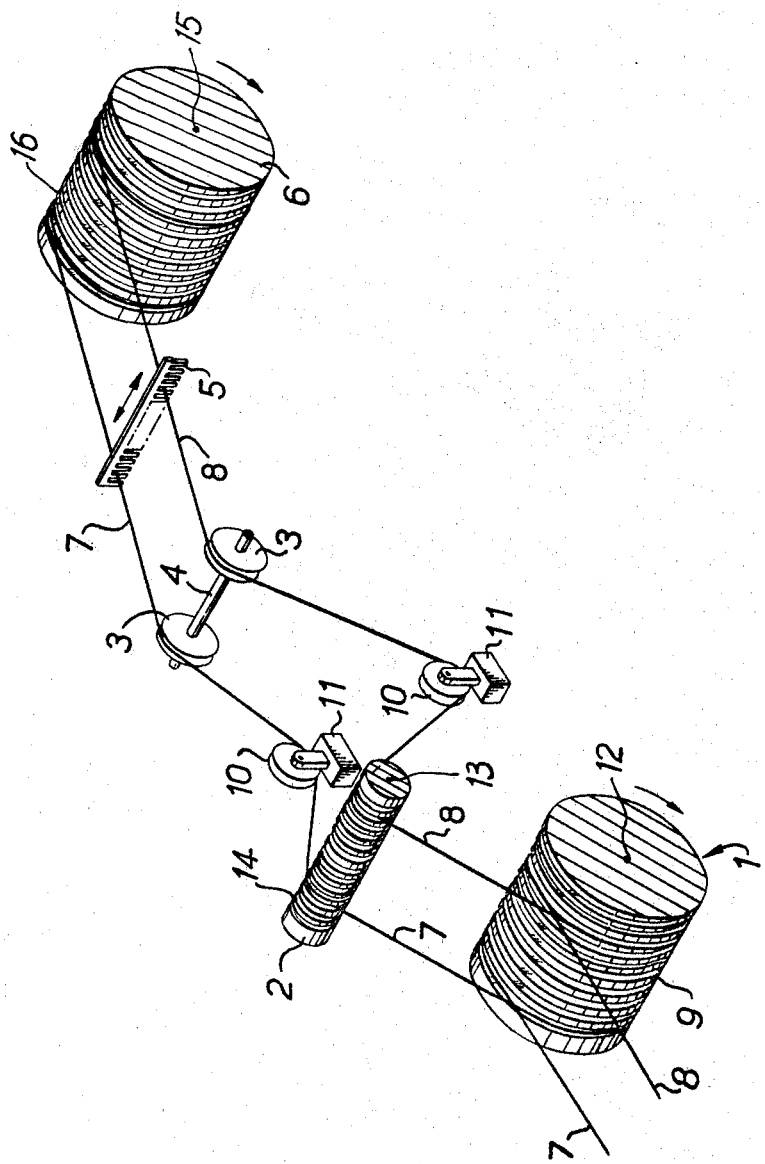
INVENTOR
GUIDO J. PEENE
BY
SPARROW AND SPARROW
ATTORNEY

United States Patent Office 3,477,653
Patented Nov. 11, 1969

3,477,653
METHOD AND MEANS FOR WINDING OF STRAND MATERIAL
Guido J. Peene, Zwevegem, Belgium, assignor to Trefileries Leon Bekaert, P.V.B.A., Zwevegem, Belgium
Filed Mar. 5, 1968, Ser. No. 710,481
Claims priority, application Great Britain, Mar. 28, 1967, 14,154/67
Int. Cl. B65h *54/00;* D02b *13/22*
U.S. Cl. 242—25                                    18 Claims

ABSTRACT OF THE DISCLOSURE

Method of and apparatus for winding separate strands side by side on a reel including drag means, the strand passing from the drag means via a separate pulley for each strand biased to tension its associated strand. The tension on each strand varies with the rate at which the strand is taken up on the reel.

Background of the invention

This invention relates to the handling of strand material in the form of wires, cables and the like, and is directed to the provision of improved methods and apparatus for winding great lengths of a large number of individual strands on to a storage reel in side by side relationship. It provides a storage reel carrying a large number of strands of wire for use in the manufacture of wire reinforced flexible sheet material, for example reinforced rubber sheet material for making vehicle tires, although it will be understood that the invention may be applied to the winding of strand material for various other purposes.

Wire reinforced rubber sheet is formed by introducing parallel strands of wire between two sheets of rubber fed into face-to-face relationship from separate supply sources, e.g. rolls of such sheet, and passing the composite assembly thus formed between calendering rolls to bond the component sheets together with the wire strands between them and thus form a composite reinforced sheet which is led away for storage and further tire manufacturing steps.

Such composite sheet is normally manufactured in great lengths of substantial width and subsequently cut up into pieces to make individual tires, the steel reinforcing wires being laid close together parallel to the length of the composite sheet. As a result a large number of wires, in the order of 600 to 1000 or more separate strands depending on the width of the sheet being made, have to be fed continuously and at the correct mutual spacing between the component rubber sheets as the latter are brought together face-to-face, and this has led to considerable difficulties in controlling the feeding of the wire strands to the composite sheet forming apparatus.

One system for controlling the feeding of the wire strands simply consists in supplying each strand from an individually rotatably mounted reel via a complicated arrangement of guide pulleys to a comb which aligns all of the strands into a single plane at the desired spacings from one another, from whence the strands are led to sheet forming apparatus.

This system, however, has a number of disadvantages. Thus, 600 to 1000 or more separately mounted reels of wire take up a very large space in the tire factory and require a substantial labor force to receive, mount, dismount and dispose of the reels at regular intervals, which has obvious economic disadvantages and makes for slow production. Moreover, it is essential that the wires be protected against corrosion during the period elapsing between their original manufacture and their incorporation in the composite sheet; as a result the reels of wire have to be supplied in expensive hermetically sealed containers which must be returned to the wire manufacturer, and the space in the tire factory where the reels of wire are mounted during use has to have its atmospheric conditions carefully controlled. Clearly these factors are also disadvantageous from an economic point of view. The packing, storage and transportation of large numbers of reels of wire is also, of course, expensive.

Another system, which obviates many of the disadvantages mentioned above, involves the wires being supplied to the tire manufacturer not on separate reels but in the form of a roll of woven wire mesh of which the warp constitutes the wire strands required for making the composite sheet. These strands are held in their correct relative positions by the weft strands and such wire mesh may therefore be led directly from its storage reel between the component rubber sheets without the provision of a combing step. However, this system also has its disadvantages; in particular, the weft strands do not serve any useful purpose in the composite shett and indeed increase its weight to an undesirable extent, while the manufacture of the wire mesh is a slow and expensive process. Also, the rolls of mesh must be interchanged during operation if it is desired to form a composite sheet in which the density or individual thicknesses of the wire reinforcing strands varies along its lengths. Also the presence of the weft strands obstructs the movement of the reinforcing warp strands to new relative positions as is desirable during the subsequent shaping of tires from the composite sheet.

It will be clear from the above explanation of known systems that the general efficiency of the tire manufacturing process would be substantially improved were it possible to provide all of the reinforcing wires wound side by side on a single storage reel or a small number of such reels without any weft strands, from which reel or reels the wires could be fed to the calendering roll via a comb arranged to align them as desired.

However, it is sometimes desirable to incorporate wires of slightly different diameters at different parts of the width of the sheet material being made up, and moreover the thicknesses of individual wires frequently vary slightly at different points in their lengths due to manufacturing tolerances. A result of these variations in wire thickness is that if great lengths of such wires are wound side by side on a storage reel, i.e. with each wire coiled on itself, simply by rotating the storage reel to draw the wires directly thereonto from individual supply reels, the lengths of the individual wires on the filled storage reel may differ from one another quite considerably. This difference in the lengths of the respective wires on the reel has in the past dictated against the supply of wires in such manner for use in the production of wire reinforced sheet material, because in order to avoid local weakness in the product the reel would have to be discarded as soon as the shortest wire thereon was exhausted, with a consequent wastage of all the remaining lengths of the other wires.

Summary of the invention

It is a primary object of the present invention to provide improved methods and apparatus for winding great lengths of a large number of separate strands on to a storage reel in such manner that the lengths of all of the strands on the filled reel are approximately equal or at least substantially nearer to being equal than has hitherto been possible to achieve by a commercially viable process.

Viewed from one aspect the invention provides a method of winding great lengths of a large number of separate strands on to a storage reel in side by side relationship, comprising drawing the strands from supplies thereof by means of rotary drag means operative to pass the strands onward at a substantially equal and controlled speed, and thence passing the strands to a rotating storage reel via separate and individual pulleys each of which is biased in such a direction as to tension its associated strand, the arrangement being such that the tension set up in each strand by the bias on its pulley automatically increases and decreases respectively as the rate at which the strand is being taken up on the said storage reel increases or decreases.

Viewed from another aspect the invention provides apparatus for winding great lengths of a large number of separate strands on to a storage reel in side by side relationship, comprising rotatable drag means receiving the strands from supplies thereof and adapted, upon rotation, to pass the strands onward at a substantially equal and controlled speed, a storage reel receiving the strands from said drag means and rotatable to wind the strands thereonto, each of the strands passing from the drag means to the storage reel via a separate and individual pulley each of which pulleys is biased in such a direction as to tension its associated strand, the arrangement being such that, in operation, the tension set up in each strand by the bias on its pulley automatically increases and decreases respectively as the rate at which the strand is being taken up on the said storage reel increases or decreases.

In another and preferred form, the force exerted on each pulley by its biasing means is constant; thus in this form the means biasing the said pulleys comprises a weight integral with or secured to each pulley, the arrangement being such that the arc of contact between each strand and its respective pulley is always less than 180°. It will be understood that in this preferred arrangement up and down movement of each pulley under the influence of varying take-up rates of its respective strand will cause simultaneous variation of the angle made between the runs of the strand on the respective sides of the pulley and, as a result, variation of the components of the biasing force which apply in each run of the strand. For example, when the take-up rate of a strand increases, its pulley will be raised and the angle between the runs of the strand on the respective sides of the pulley will increase, with the result that the equal force components supporting the weighted pulley must increase and thus the tension in the strand increases to wind it more tightly on the storage reel.

In a preferred form of the invention further support and guide means for the strands are provided both between the said drag means and the said biased pulleys and between the latter and the storage reel. Thus a support roller may be mounted between the said drag means and the said pulleys, each strand passing over said support roller in a separate groove therein. The support means between the biased pulleys and the storage reel preferably comprises an individually rotatable guide pulley for each of the strands rather than a roller common to all of them, as relative movement between the strands will of course occur over this region of their travel when their take-up rates change; in a preferred form all of said guide pulleys are mounted for individual rotation on a common shft having its axis parallel with the axis of the storage reel.

Preferably the apparatus will include a comb through which the strands pass immediately upstream of the said storage reel, so as to ensure their correct relative alignment on the reel. Means may then be provided for reciprocating the said comb lengthwise in time with the rotation of the storage reel, so as to bed successive turns of the strands between previous strand turns on the said reel.

Brief description of the drawing

In order that the invention may be more readily understood, one embodiment of the same will now be described by way of example and with reference to the accompanying drawing, which is a diagrammatic perspective view of a preferred apparatus.

Description of the preferred embodiment

With reference to the summary of the invention heretofore stated, the rotary drag means and the storage reel will normally be driven at rates of rotation such as to equalize the average linear velocity of the strands leaving the drag means and the average linear velocity of the strands arriving at the storage reel. However, differences will occur between the linear velocities of the strands as they are taken up on the storage reel, due to variations in the thicknesses of the strands tending to cause variations in the diameters of the separate strand coils on the reel. Thus if the thickness of a particular strand at a region of its length is greater than the thickness of its neighboring strands on the storage reel, either by intent or due to manufacturing tolerances, the coil of that strand on the storage reel will, over that region of its length, tend to increase in diameter faster than the average of all of the strands, with the result already referred to that a greater length of that strand will be present on the reel when it is filled than will be so in the case of the neighboring strands. In accordance with the method of the invention this variation of the rate at which a particular strand is taken up by the storage reel, in dependence on the thickness of the strand, is made to bring about a consequential variation in the tension in the strand concerned. As a result, if the takeup rate of a strand increases over the average as a result of an increase in its thickness, then its tension also increases; consequently it is wound more tightly on the storage reel, so as at least approximately to cancel out the abnormal increase in the diameter of its coil on the storage reel which brought about such increased take-up rate. An opposite effect will occur if the thickness of a particular strand decreases as its take-up rate will then decrease relative to the average take-up rate of all of the strands and its tension will also decrease, whereby it will be wound more loosely on the storage reel so as at least approximately to cancel out the low rate of increase of the diameter of its coil which brought about such decrease in its take-up rate. Thus all of the strands will be acted upon individually in dependence on their take-up rates on the storage reel, and thereby on their thicknesses, with the result that the lengths of the respective strands on the filled storage reel will be at least substantially nearer to being equal than has hitherto been possible to achieve commercially.

With reference to arrangement and tensions set up in each strand, stated heretofore in the summary of the invention, it will be realized that changes in the tensions in the respective strands to achieve the desired effect will only occur consistently if the strands are continually supplied from the said drag means at a substantially equal and controlled speed; in other words an abnormal increase in the take-up rate of any particular strand on the storage reel must not cause slipping of that strand on the drag means. In a preferred form of the invention the said drag means comprises a drum mounted for axial rotation with its axis parallel with that of the said storage reel, each strand passing around the said drum in a separate circumferential groove thereon, the length of the frictional contact between each strand and the drum being sufficient to prevent slipping of the strand on the drum in operation.

The means biasing the said pulleys to tension the strands may take any of a number of forms, so long as the nature of such means is such that the tension set up in each strand by the bias on its pulley will automatically increase and decrease with the rate of take-up of the strand on the storage reel. Thus in one form the biasing means could comprise a separate tension spring connecting each pulley to a fixed surface, such as the floor if the strand passes under the pulley or the ceiling if the strand pases over the pulley. In this arrangement the change in tension in the strand will be brought about by the extension or contraction of the spring when a change in the take-up rate of the strand causes its pulley to be drawn away from the fixed surface by the strand (in the case of an increase in the take-up rate) or to be drawn towards the fixed surface by the spring (in the case of a decrease in the take-up rate). In such an arrangement it is preferably that the arc of contact between each strand and its respective pulley should always be maintained at 180°, i.e. that the runs of the strand on the respective sides of the pulley shoud be parallel with one another, so that the direction of the varying spring force on the pulley will always be parallel with such runs of the strand; as a result the tension in the strand will depend only on the varying spring force without a further variation being introduced as a result of alterations in the angle made between the said strand runs when the position of the pulley alters.

Where the pulleys are biased by being weighted, the axis of the said support roller and the said guide pulley shaft are parallel and are spaced apart by a rectilinear distance substantially greater than the diameters of the said biased pulleys, so that the runs of each strand on the respective sides of its biased pulley will always be divergent upwardly from the pulley for the purpose already explained.

Referring now to the drawing which depicts by way of example method and means for carrying out the invention, the apparatus includes rotary drag means in the form of a drum 1, a strand support roller 2, strand guide pulleys 3 mounted on a shaft 4, a comb 5, and a storage reel 6. The axis of the support roller 2 and guide pulley shaft 4 are parallel and are spaced apart by a rectilinear distance substantially greater than the diameters of the biased pulleys 10 (hereinafter more particularly described). It should be understood that, as already mentioned, the drawing is purely diagrammatic and does not seek to convey the detailed construction of a commercial installation which will usually be adapted to wind at least 100 separate strands on to a storage reel simultaneously, but rather to illustrate the principles of operation of the apparatus. Thus only two of a large number of strands are shown in the drawing, these being designated 7 and 8.

Referring now to the various parts of the apparatus in more detail, the drum 1 is formed with a large number of separate and parallel circumferential grooves 9, and each of the large number of strands to be operated upon is led from a supply reel thereof (not shown) and once around the drum 1 in one of the grooves therein. The drum is suitably mounted for rotation about its axis 12 in the direction indicated by the arrow and is continually driven in that direction in operation whereby it steadily draws all of the strands from their supply reel and passes them onward at an equal and controlled speed. The drum 1 is of large enough diameter to ensure that the length of frictional engagement between its grooved surface and each strand is sufficient to prevent slipping of the strands on the drum, so that a steady feed of the strands to the following parts of the apparatus is achieved. If desired the drum may be surfaced with a material having a high coefficient of friction.

The roller 2 is mounted for free rotation about its axis 13, and is preferably formed like the drum 1 with circumferential grooves 14 to maintain the strands at their desired spacing from one another.

From the roller 2 each of the strands passes under an individual pulley 10 each of which hangs freely in space and is biased downwardly by a weight 11 suspended therefrom, all of the weights 11 being of equal mass.

The shaft 4 is rigidly mounted and each of the guide pulleys 3 (one for each strand) is freely rotatable thereon.

The storage reel 6 on which the strands are to be wound side by side is mounted for axial rotation about its axis 15 like the drum 1 and is driven in continuous rotation in operation in the direction of the arrow so as to draw the strands through the apparatus from the drum and to wind them on to the storage reel. If desired the storage reel may, like the drum 1, be formed with circumferential grooves 16 for the reception of the first turns of the respective strands thereon. The means for rotating the drum 1 and the storage reel 6 will be linked in some suitable manner so that the strands are fed by the drum 1 at the same speed as the average speed at which they are wound on the storage reel. It will be understood that, if the storage reel is rotated at the same speed throughout the process of filling the same, the speed at which it takes up the strands will increase as the strand coils thereon increase in diameter; thus in these circumstances the speed of rotation of the drum will also have to be gradually increased. Alternatively, of course, the drum could be rotated at a constant speed and the speed of rotation of the storage reel gradually reduced.

The comb 5 is mounted for lengthwise reciprocating movement and is driven in such fashion during operation in time with the rotation of the storage reel so that the position of each strand is adjusted transversely, first in one direction and then in the other, at the completion of each turn thereof on the storage reel; as a result each successive turn of each strand will bed between the immediately preceding turns of itself and one or other of its neighboring strands, thus ensuring a compact packing of the strands on the reel.

The two illustrated strands 7 and 8 have been chosen to exemplify, in the case of the strand 7, one in which a region of increased thickness in passing through the apparatus and, in the case of the strand 8, one in which a region of decreased thickness in passing. As previously explained the increased thickness of strand 7 will, unless it is compensated, cause the length of that strand wound on the storage reel to be greater than the average, while the opposite will be so in the case of strand 8.

The effect of the increase in thickness of strand 7 has been to cause the diameter of its coil on the storage reel to increase at a greater rate than the average, with the result that the strand has begun to be taken up on the reel at a higher rate than the average. Consequently a greater quantity of the strand 7 has been drawn over its guide pulley 3, and the result of this is to raise its biased pulley 10, as the rate at which the strand is drawn over the roller 2 cannot after due to the action of the drum 1. However, the raising of the weighted pulley 10 causes the tension in the strand 7 to increase because it must now support the weighted pulley at a more oblique angle than before. Such increased tension causes the strand 7 to be wound more tightly on the storage reel so as at least partly to cancel out the abnormal rate of increase of the diameter of its coil thereon and thus again to reduce the rate at which it is being taken up on the reel.

In the case of the strand 8 it will be seen that the opposite effect has occurred. A thinning of the strand has reduced the rate of increase of its coil diameter on the storage reel with a corresponding diminution of its take-up rate, a lowering of its weighted pulley 10, and a consequent decrease in the tension in the strand. As a result strand 8 is wound more loosely on the storage reel so as to compensate for its reduced thickness.

It will be understood that all of the 100 or more strands being wound through the apparatus will be individually influenced in the manner described above whenever their thicknesses increase or decrease.

It will thus been seen that the invention provides a simple, efficient and commercially viable process for filling a reel with separate strands which are of substantially equal length or are at least substantially more nearly equal in length than has hitherto been possible commercially.

The method and apparatus of the invention are applicable to the winding of all kinds of strand material but are particularly useful in the filling of storage reels with wires for incorporation in reinforced sheet material.

It will be understood that the word "pulley" used in the specification and claims shall be construed as comprising any grooved member or device capable of accomplishing the intended desired results.

While the invention has been described and illustrated with respect to a preferred example which gives satisfactory results, it will be understood by those skilled in the art after understanding the principle of the invention that various changes and modifications may be made without departing from the spirit and scope of the invention and it is intended therefore in the appended claims to cover all such changes and modifications.

What I claim is:

1. A method of winding great lengths of a large number of separate strands on to a storage reel in side by side relationship, comprising drawing the strands from supplies thereof by means of rotary drag means operative to pass the strands onward at a substantially equal and controlled speed, and thence passing the strands to a rotating storage reel via separate and individual pulleys each of which is biased in such a direction as to tension its associated strand, the arrangement being such that the tension set up in each strand by the bias on its pulley automatically increases and decreases respectively as the rate at which the strand is being taken up on the said storage reel increases or decreases.

2. A method according to claim 1, wherein the strands are supported and guided at at least one point both in their passage between the said rotary drag means and the said biased pulleys and in their passage between the latter and the said storage reel.

3. A method according to claim 1, wherein the strands are passed through a comb immediately prior to being wound on the said storage reel.

4. A method according to claim 3, wherein the said comb is reciprocated lengthwise in time with the rotation of the storage reel, so as to bed successive turns of the strands between previous strand turns on the said reel.

5. Apparatus for winding great lentghs of a large number of separate strands on to a storage reel in side by side relationship, comprising rotatable drag means receiving the strands from supplies thereof and adapted, upon rotation, to pass the strands onward at a substantially equal and controlled speed, a storage reel receiving the strands from said drag means and rotatable to wind the strands thereonto, separate and individual biased pulleys, each of the strands passing from said drag means to the storage reel via its associated separate and individual pulley, each of said pulleys being biased in such a direction as to tension its associated strand, the arrangement being such that, in operation, the tension set up in each strand by the bias on its associated pulley automatically increases and decreases respectively as the rate at which the strand is being taken up on the said storage reel increases or decreases.

6. Apparatus according to claim 5, wherein the said drag means comprises a drum mounted for axial rotation with its axis parallel with that of the said storage reel, each strand passing around the said drum in a separate circumferential groove thereon, the length of the frictional contact between each strand and the drum being sufficient to prevent slipping of the strand on the drum in operation.

7. Apparatus according to claim 5 wherein the means biasing the said pulleys comprises a weight associated with each pulley, the arrangement being such that the arc of contact between each strand and its respective pulley is always less than 180°.

8. Apparatus according to claim 6, wherein the means biasing the said pulleys comprises a weight associated with each pulley, the arrangement being such that the arc of contact between each strand and its respective pulley is always less than 180°.

9. Apparatus according to claim 5, including a support roller between the said drag means and the said pulleys, each strand passing over said support roller in a separate groove therein.

10. Apparatus according to claim 5 wherein each strand passes over a further individually rotatable but fixedly mounted guide pulley between its said biased pulley and the said storage reel.

11. Apparatus according to claim 5 wherein all of said guide pulleys are mounted for individual rotation on a common shaft having its axis parallel with the axis of the storage reel.

12. Apparatus according to claim 9 wherein all of said guide pulleys are mounted on a common shaft and the axes of the said support roller and the said shaft are parallel and are spaced apart by a rectilinear distance substantially greater than the diameters of the said biased pulleys.

13. Apparatus according to claim 11 wherein the axes of the said support roller and the said guide pulley shaft are parallel and are spaced apart by a rectilinear distance substantially greater than the diameters of the said biased pulleys.

14. Apparatus according to claim 5, including a comb through which the strands pass immediately upstream of the said storage reel.

15. Apparatus according to claim 14, including means for reciprocating the said comb lengthwise in time with the rotation of the storage reel, so as to bed successive turns of the strands between previous strand turns on the said reel.

16. Apparatus for winding great lengths of a large number of separate strands on to a storage reel in side by side relationship, comprising rotatable drag means receiving the strands from supplies thereof and adapted, upon rotation, to pass the strands onward at a substantially equal and controlled speed, a storage reel receiving the strands from said drag means and rotatable to wind the strands thereonto, separate and individual biased members, each of the strands passing from said drag means to the storage reel via its associated separate and individual member, each of said members being biased in such a direction as to tension its associated strand, the arrangement being such that, in operation, the tension set up in each strand by the bias on its associated member automatically increases and decreases respectively as rate at which the strand is being taken up on the said storage reel increases and decreases.

17. Apparatus according to claim 16, wherein each strand passes over a further individually rotatable but fixedly mounted guide member between its said biased member and said storage reel.

18. Apparatus according to claim 17, including support means between said drag means and said biased members, each strand passing over said support means.

References Cited

UNITED STATES PATENTS

| 1,626,829 | 5/1927 | Hornbuckle et al. | 28—37 |
| 2,159,635 | 5/1939 | Ranney | 242—25 |
| 2,250,234 | 7/1941 | Pierce | 242—25 |
| 2,717,125 | 9/1955 | Rayburn | 242—25 |
| 2,955,770 | 10/1960 | Ensor | 242—25 |

NATHAN L. MINTZ, Primary Examiner

U.S. Cl. X.R.

28—35